Patented July 2, 1929.

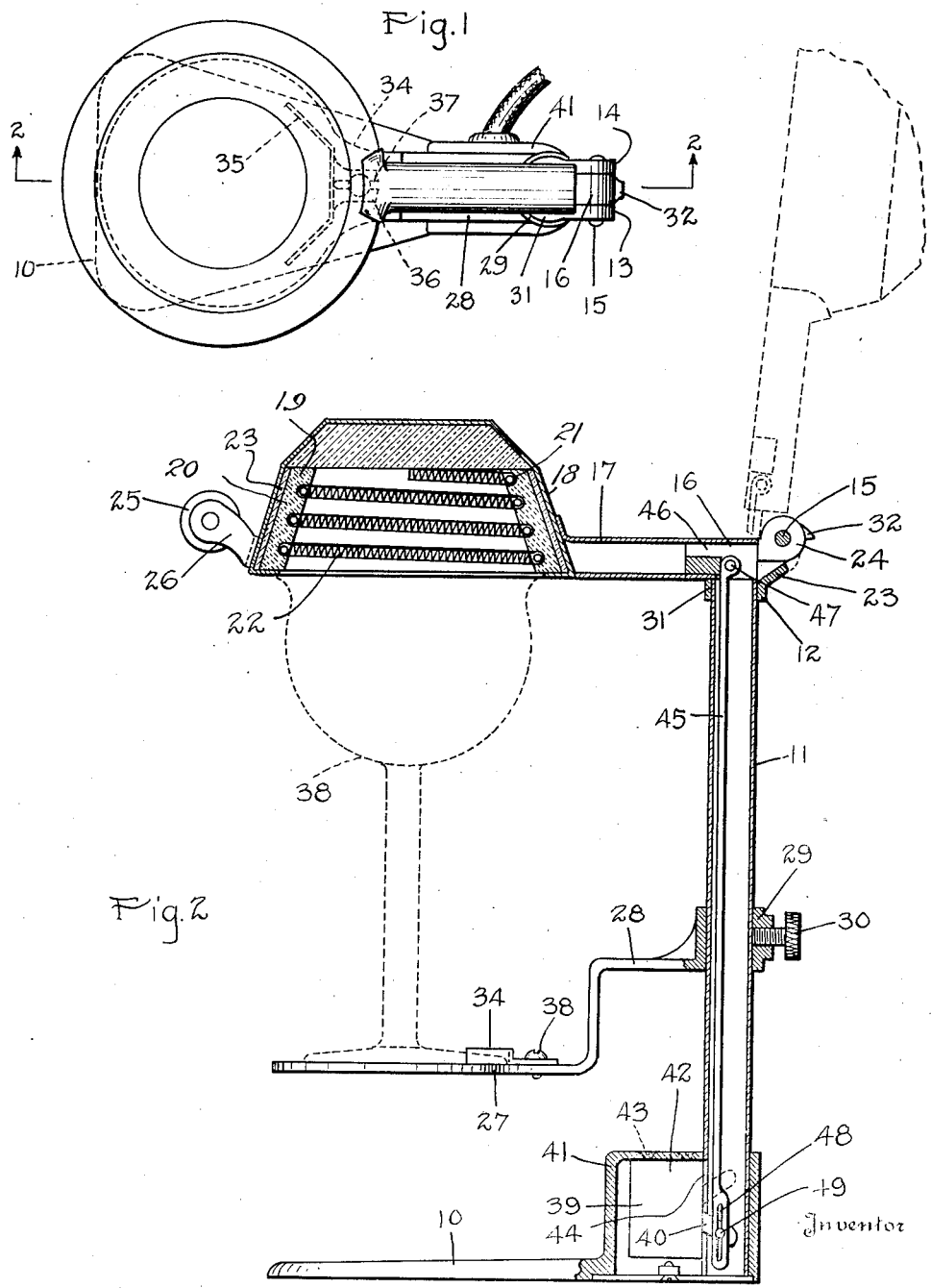

1,719,710

UNITED STATES PATENT OFFICE.

GERALD G. MATTHEWS, OF MINNEAPOLIS, MINNESOTA, ASSIGNOR OF THREE-TENTHS TO WILLIAM H. MATTHEWS, OF MINNEAPOLIS, MINNESOTA.

TOASTING DEVICE.

Application filed October 26, 1927. Serial No. 228,782.

My invention relates to toasting devices and particularly to devices adapted to toast meringue placed upon edibles, such as ice cream, contained in dishes or in containers suitable for direct consumption.

An object of the invention resides in providing a base having a standard issuing upwardly therefrom and in hingedly connecting to the upper part of the standard a swinging heating element having its heating surface exposed from beneath, and in further mounting upon said standard an adjustable platform adapted to receive the container, said platform being movable toward and away from said heating element and said heating element being adapted to be positioned directly above said platform or to be swung away from the same.

Another object of the invention resides in providing an adjustable stop upon the platform for positioning and centering the receptacle relative to the heating element superimposed above the same.

A still further object of the invention resides in providing an electrical switch in said base and in further providing a link connected with said switch and with the attaching means for said heating element adapted to throw off the current to said heating element upon moving the heating element away from said platform.

With the foregoing and other objects in view, which will appear in the following description, the invention resides in the novel combination and arrangement of parts and in the details of construction hereinafter described and claimed.

In the drawings:

Fig. 1 is a plan view of an embodiment of my invention.

Fig. 2 is a vertical sectional view taken on line 2—2 of Fig. 1.

A most attractive and palatable edible may be produced by placing ice cream within a suitable dish or container, covering or coating the same with a layer of meringue and toasting the meringue immediately prior to the service of the dish. Considerable skill and difficulty, however, is encountered in the preparation of this dish where the toasting is attempted to be accomplished by means ordinarily available for this purpose due to the fact that the ice cream is frequently melted or caused to become mushy due to the heat necessary to toast the meringue. This difficulty is overcome in my invention in a manner which will presently become apparent, allowing the edible to be prepared in the same dish in which the same is to be served without loss of time and without subjecting the dish or the contents directly to the heat.

The form of my invention illustrated in the drawing comprises a base 10 which may be a casting or may be constructed in any other suitable manner and which has attached to it a tubular standard 11 issuing upwardly therefrom at the rearward portion of the same. At the upper end of said tubular standard is arranged a hinge structure 24 which comprises a small casting 12 formed with two hinge leaves 13 and 14 spaced from one another and issuing upwardly and rearwardly from the device. To these hinge leaves is hingedly connected through a pintle 15 an attaching member 16 which has secured to it a tubular arm 17 issuing away from the standard 11 and in a direction above the base 10. The arm 17 has secured to the end of it a conical shaped sheet metal case 18 which encloses a similarly shaped heating element 19 best shown in Fig. 2. This heating element comprises an insulating block 20 of some refractory material, such as fire clay or other suitable material, which is arranged with a plurality of spirally formed grooves 21 adapted to receive a heating coil 22 formed of some suitable resistance wire capable of being heated to a red heat upon the passage of electric current therethrough. The leads for the said heating coil pass through the tubular arm 17 and through the tubular standard 11, the current through the same being controlled, as will be presently described. The block 20 containing the coil 22 is preferably separated from the case 18 by means of an asbestos lining 23 which serves to prevent the said case 18 from becoming hot during the operation of the device. The entire heating element 19 may be moved upon the hinge structure 24 by means of a wooden or other heat resisting handle 25 which is spaced from the case 18 and attached thereto by means of two brackets 26. This handle, as stated, serves to raise the heating element 19 from its lowermost position shown in full lines in Fig. 2 to its uppermost position as shown in dotted lines in the same figure.

Immediately below the heating element 19 is arranged an adjustable platform 27 which is superimposed by said heating element and which is formed with an arm 28 terminating in a boss 29 slidably positioned upon the standard 11. A thumb screw 30 in said boss serves to hold the platform 27 in any vertically adjusted position relative to the said heating element 19.

The heating element 19 is held in either of its extreme positions by the following construction: The hinge leaves 13 and 14 are so disposed that when the tubular arm 17 is in its horizontal position as illustrated in full lines in Fig. 2, the lowermost portion of the same rests upon the forward portions 31 of the casting 12. This limits the downward movement of the said heating element causing the same to lie, when in such position, with the lowermost surface thereof substantially horizontal. The upper movement of the heating element 19 is limited by means of a lug 32 formed on the hinge leaf portion of the attaching member 16, which lug is adapted to engage a bridge member 33 connecting the two hinge leaves 13 and 14 of casting 12. When in such position, the heating element 19 is disposed rearwardly of the vertical plane passing through said hinge leaf so that the same remains in elevated position through the action of gravity. With this arrangement it can readily be comprehended that the heating element may be raised or lowered and remains in either position where left.

For the purpose of assisting the user in centering the dish in which the substance to be toasted is placed relative to the heating element 19 so as to permit of bringing the same as close to the surface to be toasted as possible, an adjustable stop 34 is employed which is best shown in dotted lines in Fig. 1. This stop comprises a V-shaped guide 35 formed on a base 36. The base 36 is arranged with a slot 37 through which a screw 38 is passed, said screw being threaded into the platform 27 and serving to hold the stop member 34 in adjusted position. By moving the same toward or from the standard 11 the position of a receptacle such as indicated at 138 in dotted lines in Fig. 2, may be varied to cause the said receptacle to center relative to the heating element 19.

For controlling the current through the heating coil 22, I employ a switch 39 which may be of the usual form constructed with a case 42 and having an oscillating switch arm 40 issuing outwardly therefrom. This switch is housed within a housing 41 formed in the base 10 adjacent the connection of the standard 11 thereto. The switch 39 is attached to the housing 41 by means of a number of screws 43 and is arranged with the switch arm 40 adapted to pass through a slot 44 in the lower end of the tubular standard 11. Within the tubular arm 11 is disposed a link 45 which extends upwardly through said standard and into a slot 46 formed in the attaching member 16. This link is pivoted at its upper end to said attaching member by means of a pintle 47 passing therethrough. Said link is preferably offset as shown to provide clearance and to permit of raising the heating element into its uppermost position. The lowermost end of the link 45 is constructed with a vertical slot 48. A pin 49 secured to the switch lever 40 passes through this slot. Upon the raising and lowering of the heating element 19, the link 45 is caused to engage the pin 49 and operates the switch, the same being permitted to snap into opening and closing position through the agency of the slot 48. The wiring for the device is preferably run through the tubular arm 17 and the standard 11, the same passing through the slot 46 of the hinge structure and being connected to the switch 39 where the same may be led from the device in any suitable manner.

In the use of my invention, a receptacle such as shown at 38 in Fig. 2, is employed which is filled with a portion of ice cream and covered with a layer of meringue. The heating element 19 is first raised to the position shown in dotted lines in Fig. 2 and the platform 27 lowered by unloosening the thumb screw 30. Container 38 may next be placed upon said platform and the heating element lowered to its lowermost position. By adjusting the stop 34, the receptacle may be centered relative to the heating element 19 and the platform 27 elevated sufficiently to bring the upper surface of the meringue in close proximity to the heating surface of said heating element. By tightening the screw 38 and the thumb screw 30, the device may be held fixedly in adjusted position. Upon the lowering of the heating element 19 the switch 39 is turned on through the agency of the link 45, which causes the heating element 22 to become heated. The heat from the same is immediately transferred to the upper surface of the meringue which is quickly and effectively toasted. By raising the handle 25 at requisite intervals the toasting process can be watched so that the surface of the meringue receives the desirable nut brown coloring which gives the same the usual attractive appearance and added flavor. It will be noted that the heating element 19 is substantially insulated on all sides excepting the lowermost surface thereof, which is directly exposed from beneath so as to transfer the heat directly to the upper surface of the meringue placed upon the ice cream within the container proper. This causes the device to operate very quickly, preventing the conduction of heat through the layer of meringue and thereby preventing melting of the ice cream within the container. At the same time it will be noted that the entire device below the heating surface of the heating element is entirely open so that the air may circulate freely about the same, whereby the heating of the container proper is entirely prevented. In this manner the ice cream can be served as cold as received from the freezer and the meringue properly toasted and warmed without affecting the condition of the ice cream.

My invention is highly advantageous in that a simple and effective device is provided for the purpose of toasting meringue as applied to edibles contained within the dishes or containers in which the same are to be served. The device lends itself readily for use in confectionary stores, hotels or restaurants where the dish is desired to be served to the public, or may equally as well be used in the home where the dish is to be served to the individual.

Changes in the specific form of my invention, as herein disclosed, may be made within the scope of what is claimed without departing from the spirit of my invention.

Having described my invention, what I claim as new and desire to protect by Letters Patent is:

1. A toasting device comprising a base, a standard issuing upwardly from said base, a support for a receptacle attached to said standard, and a heating element mounted on said standard, said heating element and support being relatively movable towards and away from one another.

2. A toasting device comprising a base, a standard issuing upwardly from said base, a support for a receptacle containing the substance to be toasted, a heating element mounted on said standard having its heating surface exposed from below, said heating element and support being relatively movable toward and away from one another to bring the heating surface thereof immediately above the receptacle mounted upon said support.

3. A toasting device comprising a base, a standard issuing upwardly from said base, a platform slidably mounted upon said standard, means for holding said platform in adjusted position, and a heating element hingedly connected to said standard, said heating element being adapted to be moved from a position immediately above said platform and to a position away from the same.

4. A toasting device comprising a base, a standard issuing upwardly from said base, a platform slidably mounted upon said standard, means for holding said platform in adjusted position, an attaching member hingedly connected to said standard, a heating element mounted upon said attaching member, said heating element having its heating surface exposed from below, said heating element being adapted to be swung from a position directly above said platform and to a position away from the same.

5. A toasting device comprising a base, a standard issuing upwardly from said base, a support attached to said standard and a heating element mounted on said standard, said heating element and support being relatively moved toward and away from one another, the heating surface of said heating element being exposed from beneath and being disposed near the upper end of said standard and away from the same so as to leave the space beneath said heating element clear for the circulation of air to prevent the melting of the contents within a container placed upon said support.

6. A toasting device comprising a base, a standard issuing upwardly from said base, a platform slidably mounted upon said standard, means for holding said platform in adjusted position, and a heating element hingedly connected to said standard, said heating element being adapted to be moved from a position immediately above said platform and to a position away from the same, and an adjustable stop mounted on said platform for centering a receptacle placed thereon relative to said heating element.

7. A toasting device comprising a base, a standard issuing upwardly from said base, a support for a receptacle containing the substance to be toasted, an attaching member hingedly connected to said standard, a heating element mounted in said attaching member, said heating element and attaching member being adapted to be moved from a position directly above said support and to a position away from said support, a switch mounted within said base, and a link connected with said attaching member and said switch for operating the same upon movement of said heating element from one position to the other.

8. A toasting device comprising a base, a standard issuing upwardly from said base, a support for a receptacle attached to said standard, a heating element mounted on said standard, said heating element and support facing one another and being relatively movable in a vertical direction toward and away from one another.

In testimony whereof I have affixed my signature to this specification.

GERALD G. MATTHEWS.